United States Patent
Johnson

(10) Patent No.: US 8,850,447 B2
(45) Date of Patent: Sep. 30, 2014

(54) MANAGING RESOURCES IN A MULTIPROCESSING COMPUTER SYSTEM

(75) Inventor: Paul Johnson, Hants (GB)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/077,796

(22) Filed: Mar. 31, 2011

(65) Prior Publication Data

US 2011/0265096 A1 Oct. 27, 2011

(30) Foreign Application Priority Data

Apr. 26, 2010 (EP) .................................... 10161005

(51) Int. Cl.
*G06F 9/46* (2006.01)
*G06F 9/50* (2006.01)

(52) U.S. Cl.
CPC .................................. *G06F 9/5077* (2013.01)
USPC ......................................... 718/105; 713/320

(58) Field of Classification Search
None
See application file for complete search history.

(56) References Cited

U.S. PATENT DOCUMENTS

| | | | |
|---|---|---|---|
| 6,859,882 B2 | 2/2005 | Fung | |
| 7,043,650 B2* | 5/2006 | Bresniker et al. | 713/324 |
| 7,127,625 B2 | 10/2006 | Farkas et al. | |
| 8,095,810 B2* | 1/2012 | Matsuzawa et al. | 713/320 |
| 2004/0111596 A1* | 6/2004 | Rawson, III | 713/1 |
| 2005/0060590 A1* | 3/2005 | Bradley et al. | 713/320 |
| 2007/0008887 A1* | 1/2007 | Gorbatov et al. | 370/230 |
| 2008/0065919 A1* | 3/2008 | Hatasaki et al. | 713/324 |
| 2008/0104587 A1* | 5/2008 | Magenheimer et al. | 718/1 |
| 2008/0234873 A1 | 9/2008 | Gorbatov et al. | |
| 2008/0250415 A1* | 10/2008 | Illikkal et al. | 718/103 |
| 2008/0301473 A1 | 12/2008 | Perez et al. | |
| 2009/0064164 A1* | 3/2009 | Bose et al. | 718/105 |
| 2009/0132840 A1* | 5/2009 | Talwar et al. | 713/320 |
| 2009/0187776 A1 | 7/2009 | Baba et al. | |
| 2009/0259345 A1 | 10/2009 | Kato et al. | |

(Continued)

FOREIGN PATENT DOCUMENTS

EP 2071458 A1 6/2009

OTHER PUBLICATIONS

International Search Report and Written Opinion, dated Jul. 7, 2011, for International Application No. PCT/EP/2011/053984, filed Mar. 16, 2011, pp. 1-9.

(Continued)

*Primary Examiner* — Emerson Puente
*Assistant Examiner* — Mehran Kamran
(74) *Attorney, Agent, or Firm* — David W. Victor; Konrad, Raynes, Davda and Victor LLP

(57) ABSTRACT

Embodiments of the invention relate to multiprocessing systems. An aspect of the invention concerns a multiprocessing system that comprises a hardware control component for selecting a hardware management action responsive to a hardware policy and a virtualization component for presenting virtual hardware resources to a software task execution environment. The system may further comprise a software workload management component for controlling at least one running software task and routing at least one new software task using the virtual hardware resources; and a communication component for signaling the software workload management component to perform a software management action in compliance with the hardware management action. The hardware policy may be a hardware power management policy, and the software management action may comprise quiescing the at least one running software task or routing the new software tasks to a different software task execution environment.

17 Claims, 4 Drawing Sheets

(56) References Cited

U.S. PATENT DOCUMENTS

| | | |
|---|---|---|
| 2009/0265568 A1 | 10/2009 | Jackson |
| 2009/0327781 A1* | 12/2009 | Tripathi ........................ 713/324 |
| 2010/0037038 A1* | 2/2010 | Bieswanger et al. ......... 712/220 |
| 2010/0107172 A1* | 4/2010 | Calinescu et al. ............ 718/104 |
| 2010/0146513 A1* | 6/2010 | Song ............................. 718/104 |

OTHER PUBLICATIONS

International Preliminary Report on Patentability, dated Oct. 30, 2012, for International Application No. PCT/EP/2011/053984, filed Mar. 16, 2011, pp. 1-4.

* cited by examiner

MANAGING RESOURCES IN A MULTIPROCESSING COMPUTER SYSTEM

The present invention relates to the management of resources in a multiprocessing computer system, and more particularly to combining dynamic workload management over a virtualization layer with control of power-consuming hardware resources.

BACKGROUND

Executing applications in a highly heterogeneous, dynamically balanced computer system or network of systems, provides a highly available, responsive platform for user applications. Such systems are typically optimized for maximum possible throughput and application response time.

Users of such complex systems have an increasing need to manage additional constraints in the way of energy efficiency and cost control. Most current approaches to managing these constraints consist of manual schemes such as energy consumption monitoring by operations staff and manual server quiesce and shutdown, or simple automated execution of the same manual process. This does not cater well for the variable demand that may be exerted on such systems, nor for the responsiveness that modern systems require.

In certain market segments, users of such systems in specific geographies (e.g., the banking sector in China) may have regulatory maximum limits on CPU consumption by the logical partitions within their servers. It is often difficult to satisfy these requirements except by cost-intensive human monitoring and manual manipulation of system resource use.

It is desirable to address these resource constraints in multiprocessing computer systems wherein the conflicting needs for dynamic workload management over a virtualization layer and for power management of hardware resources cannot be reconciled other than partially, and by means of expensive and potentially error-prone application and system redesign.

BRIEF SUMMARY

Exemplary embodiments of the invention relate to the management of resources in a multiprocessing system. One aspect of the invention concerns a system for managing a multiprocessing computer system comprising a hardware control component for selecting a hardware management action responsive to a hardware policy, and a virtualization component for presenting virtual hardware resources to a software task execution environment. The system may further comprise a software workload management component for controlling at least one running software task and routing at least one new software task using the virtual hardware resources.

The system may include a communication component for signaling the software workload management component to perform a software management action in compliance with the hardware management action. The hardware policy may be a hardware power management policy. The software management action may include quiescing a running software task and routing new software tasks to a different software task execution environment. The hardware management action may comprise shutting down a hardware resource and starting a hardware resource.

A second aspect of the invention concerns a method for managing a multiprocessing computer system comprising selecting a hardware management action responsive to a hardware policy and presenting virtual hardware resources to a software task execution environment. The method may include controlling at least one running software task and routing at least one new software task using the virtual hardware resources, and signaling the software workload management component to perform a software management action in compliance with the hardware management action. The hardware policy may be a hardware power management policy. The software management action may include quiescing a running software task and routing new software tasks to a different software task execution environment. The hardware management action may comprise shutting down a hardware resource and starting a hardware resource.

A third aspect of the invention concerns a computer program product for managing a multiprocessing computer system. The computer program product comprises a computer readable storage medium having computer readable program code embodied therewith. The computer readable program code may comprise program code configured to cause the computer system to perform all the steps of the method of the second aspect, when the computer loads and executes the program code.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

Exemplary embodiments of the invention will now be described by way of example only, with reference to the accompanying drawings, in which.

DETAILED DESCRIPTION

Exemplary embodiments of the invention relate to a system, method, and computer program product for communicating between a hardware resource layer of a complex computing system and a routing layer so that, in spite of an intervening virtualization layer, hardware resource policies may be enacted in the system without significantly impacting the operation of dynamic routing of application task workloads.

Figure 1:
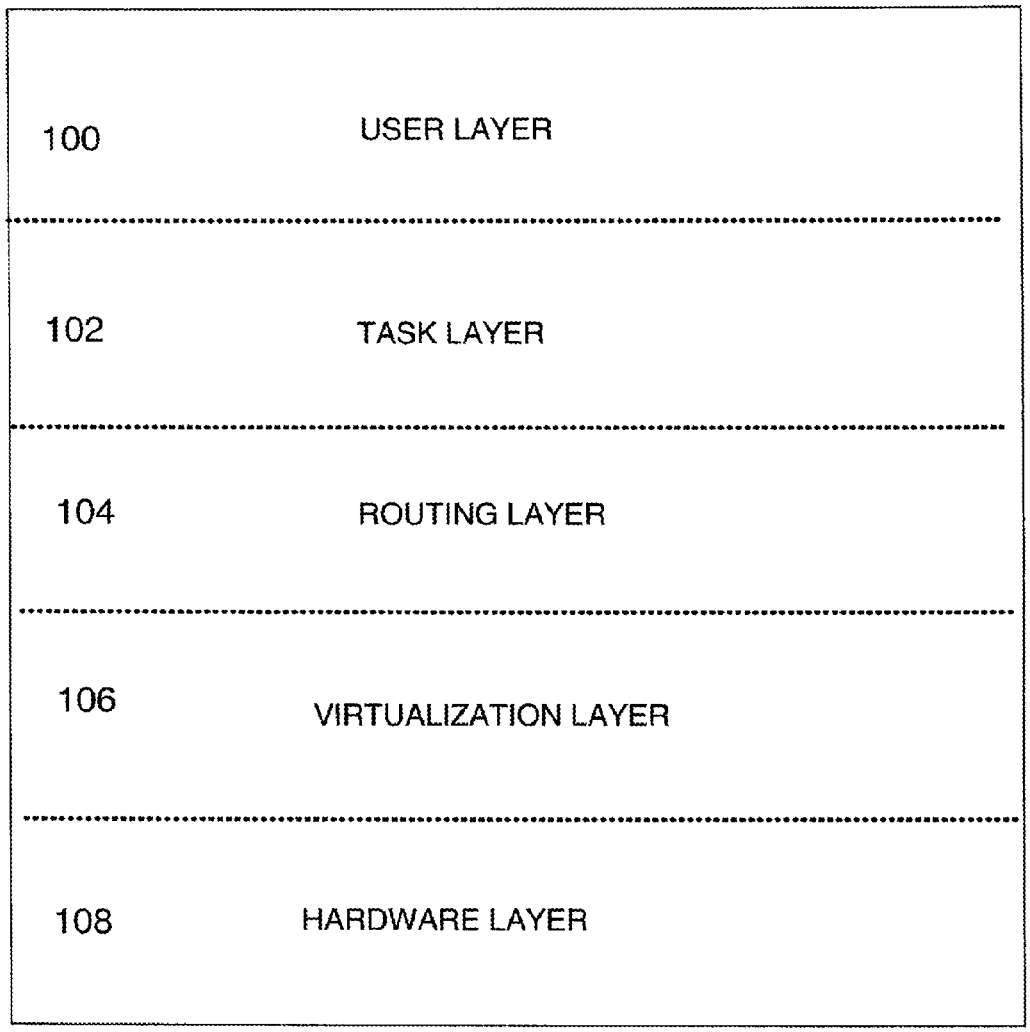
FIG. 1 illustrates the layers of a complex dynamically-routing, virtualized system in which the embodiments of the invention may be provided.

FIG. 1 shows the layers of a complex dynamically-routing, virtualized system in which exemplary embodiments of the invention may be provide. The system may include a user layer 100 at the top of a system stack. The user layer 100 may consist of client systems on which "real-life" applications, such as business processes, are initiated and where user I/O interactions occur. Beneath user layer 100 lies task layer 102, in which application tasks may be initiated to satisfy the requirements of user layer 100 applications. In reality, in such complex systems as are under consideration here, these underlying tasks may be dynamically routed among logical partitions, address spaces or the like, and this activity is achieved by routing layer 106, which may comprise a workload manager.

The nature of such dynamically-routed task systems is that, at least conceptually, there may be a virtualization layer 106 between the upper, software-implemented layers in the stack and the underlying hardware resources. The underlying hardware resources may lie at the base of the stack in the hardware layer 108, and it is at this level in the stack that real, physical resources, such as, for example, processors and storage devices may reside, and where considerations such as power consumption, physical space requirements and the need for cooling must be taken into consideration.

Figure 2:
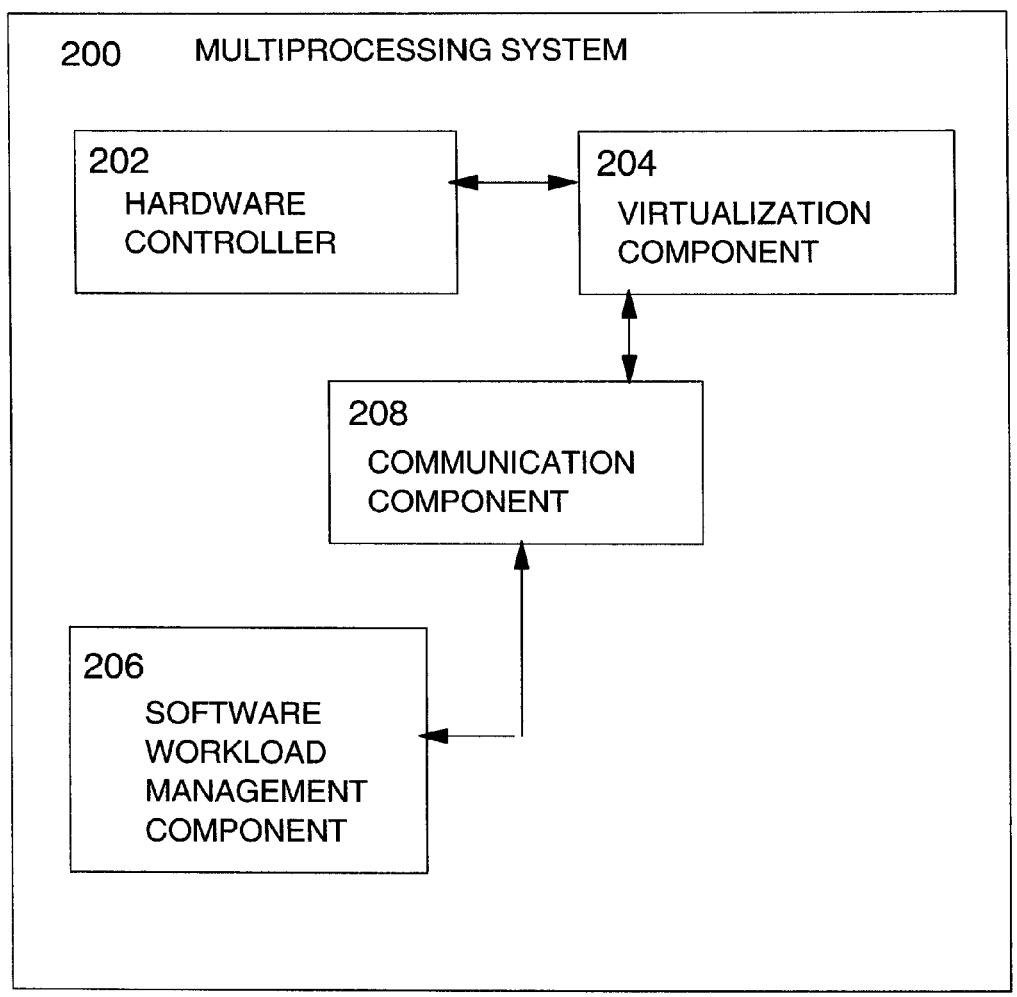
FIG. 2 illustrates a simplified representation of multiprocessing system components in which the embodiments of the invention may be provided.

FIG. 2 illustrates an exemplary multiprocessing system of intercommunicating components in which an embodiment of the invention may be implemented in a much-simplified schematic form. The system may comprise a multiprocessing system 200 in which a hardware controller 202 is in direct communication with a virtualization component 204. The system may further include a communication component 208 to provide communication between hardware controller 202 and software workload management component 206 for the purpose of correctly implementing hardware policies. The communication component 208 may be capable of presenting appropriate data and signals both to hardware controller 202 via virtualization component 204 and to software workload management component 206, thus overcoming the "information gap" that is caused by having the virtualization layer between the hardware layer 108 and the routing layer 104 of FIG. 1.

The illustrated embodiment of the invention may introduce energy consumption metrics in the hardware layer which has information on hardware resources, such as CPU structures, and storage to logical partition and address space relationships. A notification capability may be provided between this hardware layer and the routing layer which controls allocation of work requests in the application task layer address spaces. A hardware policy may be applied to the energy consumption metrics at the hardware layer to identify hardware resources that can be relinquished to reduce energy consumption at any particular time.

The notification capability may cause the routing layer to autonomically redistribute work away from, and subsequently back to, those address spaces that have been identified as associated with the underlying hardware resources. Thus, resource management policies and their implementation in the hardware layer can identify potential CPUs that are capable of being successfully "drained" (that is, have running tasks complete or quiesce and allow no new tasks to start). Corresponding events or signals can be issued for the logical partitions or address spaces associated with those CPUs to cause the running tasks to quiesce and to allow no new tasks to be started. It will be clear to one of ordinary skill in the art that simply removing any allocation from the logical partitions or address spaces for already-running tasks is not desirable as this would block work already in progress.

The routing layer, on receiving a notification to "drain" may then route any new requests away from these address spaces (although it will be clear to one of ordinary skill that this action is subject to any affinity relations between tasks and address spaces based on, for example, local data ownership by an address space). The address space passes through a quiescing-to-quiesced transition. A return notification, or observation of the quiesced state by a monitoring component in the hardware layer, could then activate the relinquishing of the hardware resources, for example, powering down the selected CPU. It will be clear to one of ordinary skill in the art that simple routing logic at the routing layer could not achieve this objective, as the mapping of address spaces and hardware (for example CPU allocation) may not be known at that level.

Figure 3:
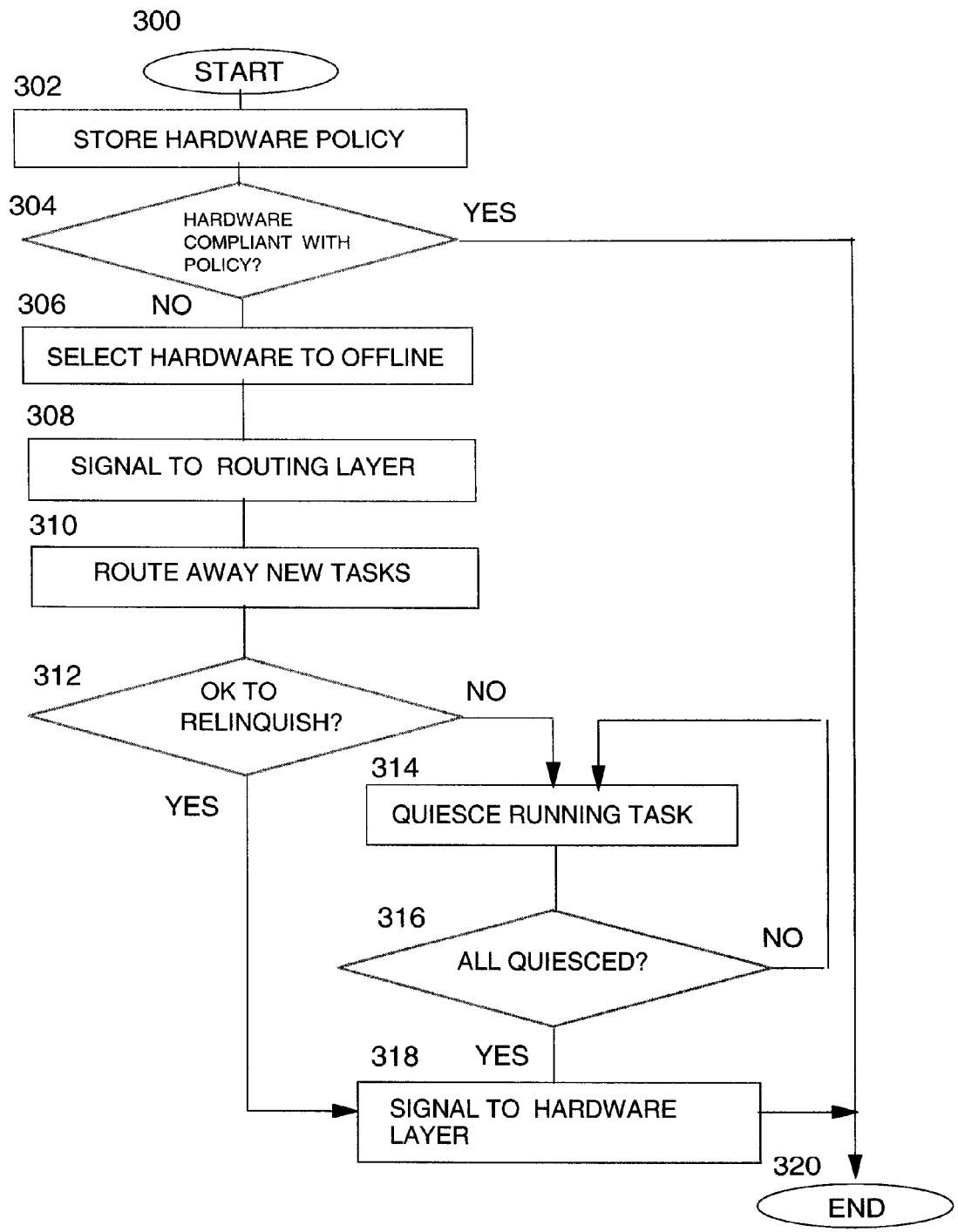
FIG. 3 illustrates a method of operation of a system according to an exemplary embodiment of the invention.

Turning to FIG. 3, there is shown a method of operation of a multiprocessing system of the type illustrated in FIG. 2 according to an exemplary embodiment of the invention. In FIG. 3, the method of operation may begin at START step 300, and at step 302, a hardware policy is stored. Test step 304 may determine whether the system is compliant with the hardware policy. If the determination at test step 304 is positive, no further action needs to be taken, and the process completes at END step 320.

In normal operation, the testing of test step 304 may be iterative, and may be implemented by any of a number of known hardware monitoring systems. If the determination at test step 304 is negative, the hardware may not be compliant with the policy and at step 306 one or more hardware resources may be selected for offlining to bring the hardware into compliance with the hardware policy that was stored at step 302. At step 308 a signal or notification may be sent to the routing layer 104, which begins, at step 310, to route, at step 306, newly-initiated tasks away from the logical partition, address space or the like that is consuming hardware resources that have been selected for off-lining. At test step 312, it is determined whether it is now possible to relinquish the hardware resource that was selected at step 306, so that it may be offlined to bring the system into compliance with the hardware policy.

If the determination at test step 312 is positive, a signal or notification may be sent to the hardware layer 108 at step 318, and the process completes at END step 320. If the determination at test step 312 is negative, one or more running tasks may need to be quiesced at step 314, and at test step 316, it is determined whether all such running tasks have been quiesced. If the determination at test step 316 is negative, steps 314 and 316 may be repeated until the outcome of test step 316 is positive, when a signal or notification is sent to hardware layer 108 at step 318, and the process completes at END step 320.

As will be clear to one of ordinary skill in the art, when the policy allows, or the workload requires, that additional hardware resources be assigned, the same notification capability can be used between the system layers to allow a hardware resource, such as a CPU, to be once more made available for workload and for address spaces associated with the resource to have new tasks routed to them.

Figure 4:
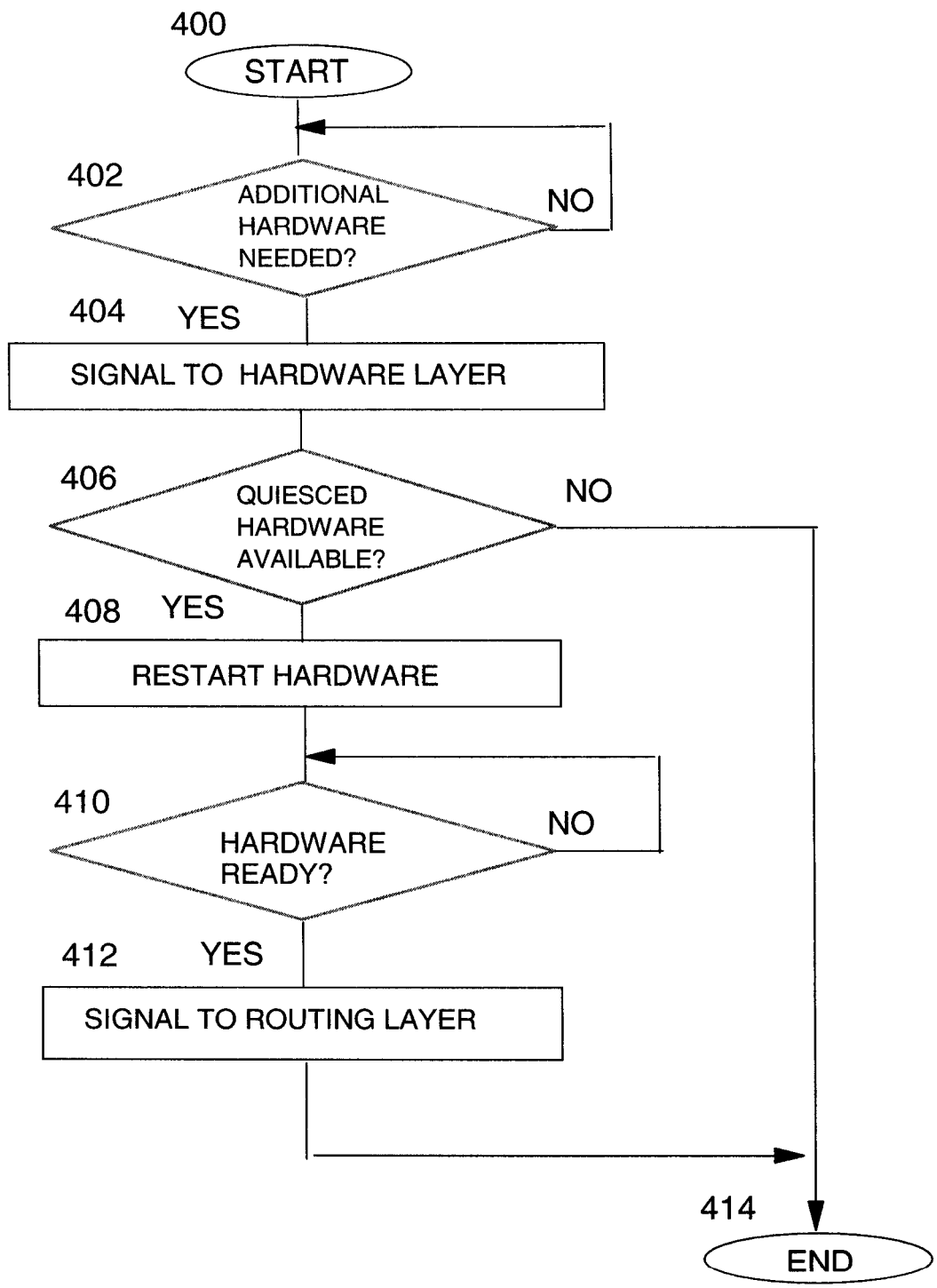
FIG. 4 illustrates a further method of the operation of a system according to an exemplary embodiment of the invention.

This reallocation of resources is illustrated in FIG. 4, in which, after START step 400, test step 402 determines whether additional hardware resource is required, and either falls within the policy or is of a high enough priority to override a "soft cap" policy ("soft caps" are well known to those of ordinary skill in the art to be maximum limits that can be overridden in exceptional circumstances). If the determination at test step 402 is negative, processing continues and the test step is repeated as necessary. This process may be implemented by any of a number of known hardware monitoring systems.

If the determination at test step 402 is positive, a signal or notification may be sent to the hardware layer 108 at step 404. At step 406, it is determined whether additional quiesced or off-lined hardware resource is available to meet the requirement of test step 402. If the determination is negative, the process completes at END step 414. If the determination at test step 406 is positive, the hardware resource may be restarted at step 408. Test step 410 may test to determine whether the hardware resource is ready (for example, whether a CPU bootstrap process has completed and an operating system, virtual machine, logical partition or the like has been fully initialized). Test step 410 may iterate until the outcome is positive, at which time a signal or notification is sent to the routing layer 104 at step 412, indicating that tasks may now be routed in such a way as to take advantage of the hardware resource, and the process completes at END step 414.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for managing a multiprocessing computer, comprising:
    a hardware control component for selecting a hardware management action responsive to a hardware power management policy, wherein said hardware management action comprises relinquishing a hardware resource to reduce energy consumption;
    a virtualization component for presenting virtual hardware resources to a software task execution environment;
    a software workload management component for controlling at least one running software task and routing at least one new software task using said virtual hardware resources;
    a communication component for signaling said software workload management component to perform a software management action in compliance with said hardware management action to implement the hardware power management policy, wherein said software management action comprises routing said new software tasks away from address spaces associated with said hardware resource to relinquish, wherein said communication component provides communication to the hardware control component via the virtualization component and provides communication between the hardware control component and the software workload management component;
    determining whether an additional hardware resource is required; and
    restarting the hardware resource in response to determining that the additional hardware resource is required.

2. The system of claim 1, wherein said software management action comprises quiescing said at least one running software task.

3. The system of claim 1, wherein said software management action comprises routing said new software tasks to a different software task execution environment away from address spaces associated with said hardware resources.

4. The system of claim 1, wherein said hardware management action comprises at least one of starting and shutting down a hardware resource.

5. The system of claim 1, wherein the communication component sends a signal to the hardware control component to activate the relinquishing of said hardware resource in response to quiescing running tasks toward said hardware resource.

6. A method of managing a multiprocessing computer, comprising:
    selecting, with a hardware control component, a hardware management action responsive to a hardware power management policy, wherein said hardware management action comprises relinquishing a hardware resource to reduce energy consumption;
    presenting, with a virtualization component, virtual hardware resources to a software task execution environment;
    controlling, with a software workload management component, at least one running software task and routing at least one new software task using said virtual hardware resources;
    signaling said software workload management component to perform a software management action in compliance with said hardware management action to implement the hardware power management policy, wherein said software management action comprises routing said new software tasks away from address spaces associated with said hardware resource to relinquish; and
    providing communication to the hardware control component via the virtualization component and providing communication between the hardware control component and the software workload management component to implement the hardware policy;
    determining whether an additional hardware resource is required; and
    restarting the hardware resource in response to determining that the additional hardware resource is required.

7. The method of claim 6, wherein said software management action comprises quiescing said at least one running software task.

8. The method of claim 6, wherein said software management action comprises routing said new software tasks to a different software task execution environment away from address spaces associated with said hardware resources.

9. The method of claim 6, wherein said hardware management action comprises at least one of starting and shutting down a hardware resource.

10. The method of claim 6, wherein the multiprocessing system comprises a hardware control component, a virtualization component, and a software workload management component.

11. The method of claim 6, wherein the communication component sends a signal to the hardware control component to activate the relinquishing of said hardware resource in response to quiescing running tasks toward said hardware resource.

12. A computer implemented program product comprising a non-transitory computer readable storage medium having computer readable program code embodied therewith, the computer readable program code comprising:
- computer readable hardware control component program code configured to select a hardware management action responsive to a hardware power management policy, wherein said hardware management action comprises relinquishing a hardware resource to reduce energy consumption;
- computer readable virtualization component program code configured to present virtual hardware resources to a software task execution environment;
- computer readable software workload management component program code configured to control at least one running software task and routing at least one new software task using said virtual hardware resources;
- computer readable communication component program code for signaling said software workload management component program code to perform a software management action in compliance with said hardware management action to implement the hardware power management policy, wherein said software management action comprises routing said new software tasks away from address spaces associated with said hardware resource to relinquish, and to provide communication to the hardware control component program code via the virtualization component and to provide communication between the hardware control component and the software workload management component;
- determining whether an additional hardware resource is required; and
- restarting the hardware resource in response to determining that the additional hardware resource is required.

13. The computer program product of claim 12, wherein said software management action comprises quiescing said at least one running software task.

14. The computer program product of claim 12, wherein said software management action comprises routing said new software tasks to a different software task execution environment away from address spaces associated with said hardware resources.

15. The computer program product of claim 12, wherein said hardware management action comprises at least one of starting and shutting down a hardware resource.

16. The computer program product of claim 12, wherein the computer program readable code is configured to operate with a multiprocessing system comprising a hardware control component, a virtualization component, and a software workload management component.

17. The computer program product of claim 12, wherein the communication component sends a signal to the hardware control component to activate the relinquishing of said hardware resource in response to quiescing running tasks toward said hardware resource.

* * * * *